United States Patent Office 3,379,791
Patented Apr. 23, 1968

3,379,791
POLYEPOXIDE AND POLYETHER PREPARED FROM REACTING A POLYEPOXIDE AND A GLYCOL
Paul A. Larson and René J. Al, Lake Jackson, Tex., assignors to The Dow Chemical Company, Midland, Mich., a corporation of Delaware
No Drawing. Filed Mar. 29, 1965, Ser. No. 443,687
6 Claims. (Cl. 260—830)

ABSTRACT OF THE DISCLOSURE

This application discloses a thermosettable epoxy resin composition containing a small quantity of a modified epoxy resin so that the composition will hold solids in suspension and prevent the sedimentation of the solids into a cake which is difficult to redisperse, the composition consisting essentially of a polyepoxide resin and from about 0.03 to 5.0 parts per 100 parts resin of a polyhydric polyether having the formula

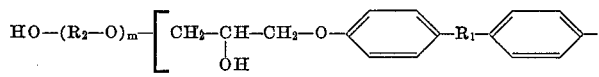

where $R_1$ is selected from the group consisting of —$CH_2$—,

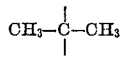

—S—, —$S_2$—, and —$SO_2$—; $R_2$ is an alkylene group containing from two to about six carbon atoms; $m$ is an integer from one to ten; and $n$ is an integer from one to three.

This invention relates to liquid epoxy resin compositions having improved solids suspending properties. More particularly, the invention concerns epoxy resins containing a small amount of a polyhydric polyether of a polyepoxide.

It is often desirable to add various solids such as fillers, pigments and the like to epoxy resins for use as adhesives, coatings, etc. The resins employed in this manner usually contain a diluent or solvent to reduce the viscosity to that of an easily spreadable mixture. Unfortunately, these mixtures, whether concentrated or diluted, do not maintain the solid fillers and pigments in suspension over long periods of time. Furthermore, it is extremely difficult to resuspend finely divided solids which have settled from suspension. Numerous additives have been tried to retard the sedimentation of solids from solutions of epoxy resins; however, the thermoset resins produced from such mixtures usually have inferior properties such as poor solvent resistance, low tensile strength, etc.

We have discovered an epoxy resin mixture containing a small quantity of a modified epoxy resin which holds solids in suspension for a greater length of time and prevents the sedimentation of the solids into a cake which is difficult to redisperse.

According to our invention, the solids suspending ability of liquid epoxy resins or their solutions is increased by the addition thereto of a polyhydric ether of a polyepoxide wherein the ether contains at least two hydroxyl groups. These polyhydric ethers can be produced by reacting a polyepoxide with a glycol in the presence of a Lewis acid catalyst. The polyepoxide used in producing the polyhydric polyether is one obtained by the epoxidation of a polyhydric phenol with an epihalohydrin such as epichlorohydrin or glycerol dichlorohydrin in the presence of sodium hydroxide or other dehydrohalogenating agent. Suitable polyhydric phenols are resorcinol, hydroquinone and the polynuclear phenols or bisphenols such as 2,2-bis-(4-hydroxyphenyl) propane, bis-(4-hydroxyphenyl) methane, bis-(4-hydroxyphenyl) sulfone, bis-(4-hydroxyphenyl) sulfide and bis-(4-hydroxyphenyl) disulfide.

The glycols which can be reacted with the polyepoxides of the polyhydric phenols to produce the polyhydric polyethers are the alkylene glycols and polyglycols having from two to about six carbon atoms in the molecule. Typical glycols within this class are ethylene glycol, diethylene glycol, triethylene glycol, propylene glycol, dipropylene glycol, butylene glycol, pentanediol and hexanediol.

The glycol and polyepoxide are reacted in the presence of a Lewis acid. It is desirable to use more than the stoichiometric amount of glycol which will react with the epoxide groups so that the product polyether will be substantially free of epoxide groups. The polyhydric polyether produced in this manner may be represented by the formula:

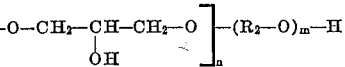

where $R_1$ is selected from the group consisting of —$CH_2$—,

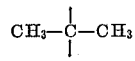

—S—, —$S_2$—, and —$SO_2$—; $R_2$ is an alkylene group containing from two to about six carbon atoms; $m$ is an integer from one to ten; and $n$ is an integer from one to three.

EXAMPLE 1

A reactor was charged with 186 parts by weight of ethylene glycol and 0.35 part $BF_3$ diethyletherate. While stirring, the temperature was raised to 86 degrees C., then 510 parts of polyepoxide were added over a period of 60 minutes. The polyepoxide was a diglycidyl ether of bisphenol A having a epoxide equivalent weight of about 188–190 produced by reacting 2,2-bis-(4-hydroxyphenyl) propane, i.e., bisphenol A, with epichlorohydrin in the presence of sodium hydroxide. The temperature in the reactor was permitted to increase to about 135 degrees C. as the reaction proceeded. The reactor was then heated to a temperature of 140–150 degrees C. and maintained at that level for 6¾ hours to get further reaction. The resinous product was subjected to vacuum distillation of 170 degrees C. and 2 mm. Hg to remove 55 milliliters (48 grams) unreacted glycol. The resulting semi-solid resin had a Durran's softening point of 60 degrees C. and a solution viscosity of Gardner H in a 40 percent solids solution in n-butyl monoether of diethylene glycol.

The reactants in Example 1 where present in the ratio of 2.2 moles ethylene glycol per mole of the diglycidyl ether of bisphenol A. The reacted mole ratio of ethylene glycol to polyepoxide was 1.65:1. Additional polyhydric polyethers were prepared from reaction mixtures containing other ratios of these reactants. The properties of the resinous polyethers are listed in Table I.

TABLE I

| Sample No. | Glycol/Epoxide Ratio | | Durran's degrees C. | Solution Viscosity Gardner |
|---|---|---|---|---|
| | Initial | Reacted | | |
| A | 3.3:2 | 1.4:1 | 72.5 | N |
| B | 2.2:1 | 1.65:1 | 60 | H |
| C | 5.5:1 | 2.5:1 | 43 | D |
| D | 11:1 | 3.8:1 | 38 | C |

The solution viscosities reported in Table I were determined with 40 percent solutions as in Example 1.

The ability of the polyether produced in Example 1 to retard the sedimentation of aluminum powder in an epoxy resin can be illustrated by Example 2.

EXAMPLE 2

An epoxy resin of the type which was reacted with the glycol in Example 1 was used in this example. One sample was prepared from 64.5 parts by weight of the epoxy resin, 10.5 parts of butyl glycidyl ether and 75 parts of atomized aluminum powder (Alcoa No. 101—Aluminum Corporation of America). Another sample containing the same quantities of these materials was modified by the addition of an amount of the polyether produced in Example 1 equal to 0.2 percent by weight of the resin-modifier composition.

The samples were placed in jars along with porcelain balls then rolled on a jar mill for 20 hours to get thorough mixing. Thereafter the suspensions were removed from the jars containing the balls and aged for 72 hours. At the end of that time, a layer of the aluminum powder had settled on the bottom of each sample jar. The ease with which a small steel spatula could penetrate the settled layer was determined by measuring the time required for the spatula to pass through the layer under its own weight. The settled layer was penetrated in 1.1 seconds in the resin sample modified with the polyether whereas 11.0 seconds were required to penetrate the unmodified sample. After standing for 144 hours, 45 seconds were required to penetrate the unmodified sample and only 4 seconds for the modified sample.

These experiments illustrate the ease or difficulty of remixing the settled powder. Table II lists the above properties of the samples prepared in Example 2 as well as the properties of epoxy resin samples modified in the same manner with the other resinous polyethers of Table I.

TABLE II

| Sample No. | Polyether Sample | Modifier, wt. Percent [1] | Penetration, sec. | | Dispersability [2] |
|---|---|---|---|---|---|
| | | | 72 hr. | 144 hr. | |
| 1 | None | | 11 | 45 | CC |
| 2 | A | 0.1 | 1.2 | 9.3 | AA |
| 3 | A | 0.3 | 3.0 | 18.0 | BB |
| 4 | B | 0.2 | 1.1 | 4.0 | AA |
| 5 | B | 0.4 | 1.0 | 8.4 | AA |
| 6 | C | 0.2 | 3.1 | 23.0 | BB |
| 7 | C | 0.75 | 1.6 | 8.0 | AA |
| 8 | D | 0.2 | 3.3 | 24.0 | BB |
| 9 | D | 0.75 | 1.6 | 8.8 | AA |

[1] Based on weight of resin plus modifier.
[2] Ease of aluminum powder redispersion after 144 hours. AA—very easily; BB—fairly easily; CC—very difficult.

The effect of concentration of the polyether modifier corresponding to Sample No. A of Table I in an epoxy resin paint formulation is illustrated by the data in Table III. The paint formulation was prepared with 250 parts of a 40 percent solution in methyl ethyl ketone of an epoxy resin produced from epichlorohydrin and bisphenol A having a molecular weight range from 1,000 to 1,000,000 with the major part being about 30,000; 250 parts "Cellosolve" acetate; 100 parts barium sulfate (Barytes No. 1—C. K. Williams and Co.); 40 parts micronized talc, (No. 399 Lo-Micron—Whitaker, Clark and Daniels, Inc.); 40 parts china clay (ASP-200—Minerals and Chemicals Corp. of America); 12 parts carbon black (Superjet M-1012—C. K. Williams and Co.); and 1.5 parts bentone 34 (National Lead Co.). After ball milling, the mixture was diluted to a viscosity of 13 seconds in a No. 4 Ford Cup with a solvent mixture containing: 131 parts by weight toluene; 30 parts acetone; 20 parts n-butyl alcohol; and 37 parts "Cellosolve" acetate. The paint samples were left standing in a jar for 40 hours, then the hardness of the sediment determined by scraping the bottom of the jar with a spatula.

TABLE III

| Sample No. | Modifier, wt. Percent (Resin plus Modifier) | Sedimentation, 40 hours |
|---|---|---|
| 1 | None | Large amount, very hard. |
| 2 | 0.25 | Slight settling, fairly hard. |
| 3 | 0.5 | Slight settling fairly soft. |
| 4 | 0.75 | No settling. |
| 5 | 2.0 | Do. |

The stability of paint formulations containing both black and white powdered pigments was determined by observing the time required for a change in color from grey to white to occur owing to pigment separation. The paint formulations were prepared by mixing a high molecular weight epoxy resin containing one of the polyether modifiers of Table I with solvents and pigments in a ball mill. The mixtures were placed in glass bottles and observed periodically to determine dispersion stability, i.e. the length of time required for separation of the pigments. The results of these observations are presented in Table IV.

TABLE IV

| Sample No. | Paint Formulation | Polyether Modifier | | Dispersion Stability |
|---|---|---|---|---|
| | | Sample | Wt. percent (resin plus modifier) | |
| 1 | [1] 661 | None | | <1 day. |
| 2 | [1] 661 | D | 2 | 1 month. |
| 3 | [1] 661 | C | 2 | Do. |
| 4 | [1] 661 | B | 2 | >6 months. |
| 5 | [1] 661 | E [2] | 2 | Do. |
| 6 | [1] 661 | A | 0.5 | 2 days. |
| 7 | [1] 661 | A | 1.0 | >6 months. |
| 8 | [1] 661 | A | 2.0 | Do. |
| 9 | [1] 661 | A | 3.0 | Do. |
| 10 | [3] 667 | None | | <1 day. |
| 11 | [3] 667 | D | 2 | 3 days. |

[1] 45 parts by weight of an epoxy resin (including the polyether modifier) having an epoxide equivalent weight in the range 475–575 and produced by the reaction of epichlorohydrin with bisphenol A in the presence of sodium hydroxide; 15 parts diacetone alcohol; 15 parts toluene; 15 parts methyl isobutyl ketone; 50 parts titanium dioxide (Titanox–RA–51— Titanium Pigment Corp.); and 4 parts black iron oxide (Mapico-Black—Columbian Carbon Co.).
[2] Ethylene glycol/epoxide ratio of 4:3.
[3] 45 parts by weight of an epoxy resin (including the polyether modifier) having an epoxide equivalent weight in the range 1,600–2,000 and produced by the reaction of epichlorohydrin with bisphenol A in the presence of sodium hydroxide; 25 parts diacetone alcohol; 25 parts toluene; 25 parts methyl isobutyl ketone; 50 parts titanium oxide; and 4 parts black iron oxide.

A resin formulation containing two parts per hundred parts resin of the modifier corresponding to Sample No. A of Table I was prepared with 200 parts of −200 mesh silica sand per hundred parts of resin. The epoxy resin used in this formulation was one having an epoxide equivalent weight of about 410 produced by reacting epichlorohydrin with bisphenol A in the presence of sodium hydroxide. A sample of this modified resin stored stored at 120 degrees C. for about 60 hours contained a slight amount of sediment which was readily redispersed whereas a sample of the same epoxy resin without the polyether modifier contained a hard sediment. The physical properties of this resin when cured with 30 parts phthalic anhydride per hundred parts resin at 155 degrees C. for eleven hours are reported in Table V.

TABLE V

| Sample No. | Modifier, phr. | Flexural Strength, p.s.i. | Flexural Moduli, p.s.i. | Tensile Strength, p.s.i. |
|---|---|---|---|---|
| 1 | None | 14,180 | $1.17 \times 10^6$ | 9,850 |
| 2 | 2 | 15,520 | $1.19 \times 10^6$ | 13,000 |

From the foregoing data it can be seen that improved solids suspension can be obtained with liquid epoxy resin formulations, including coatings compositions containing non-reactive solvents, and/or reactive diluents by the addition of as little as 0.1 part of the polyhydric polyether per hundred parts of epoxy resin without a corresponding deterioration or dilution of physical properties. Accordingly, the improvements afforded by this invention can be realized by the incorporation of about 0.03 to about 5.0 parts per hundred parts resin and preferably about 0.2 to about 2.0 parts of the polyether per hundred parts of epoxy resin in the formulation.

These polyethers can be used to improve the solids suspending ability of any of the common polyepoxide formulations such as those derived from epichlorohydrin and bisphenol A as exemplified above as well as those produced by the epoxidation of a phenol-formaldehyde novolac or other polyhydric phenols.

Epoxy resins containing the polyhydric polyether can be cured with any of the customary epoxy curing agents such as the polyamines, dicarboxylic acid anhydrides and the catalytic curing agents such as $BF_3$ monoethylamine, dicyandiamide, and the like.

We claim:
1. A thermosettable epoxy resin composition which consists essentially of a polyepoxide resin and from about 0.03 to about 5.0 parts per hundred parts resin of a polyhydric polyether having a the general formula

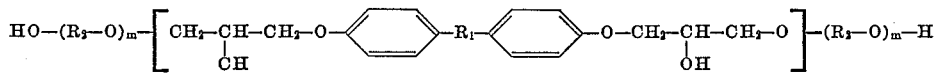

where $R_1$ is selected from the group consisting of

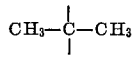

—S—, —$S_2$—, and —$SO_2$—; $R_2$ is an alkylene group containing from two to about six carbon atoms; $m$ is an integer from one to ten; and $n$ is an integer from one to three.

2. A thermosettable epoxy resin composition which consists essentially of a polyepoxide resin and from about 0.2 to about 2.0 parts per hundred parts resin of a polyhydric polyether according to claim 1.

3. A thermosettable epoxy resin composition according to claim 3 wherein said polyether is produced by reacting ethylene glycol with a polyepoxide obtained in the reaction of epichlorohydrin with a polyhydric phenol in the presence of a dehydrohalogenating agent.

4. A thermosettable epoxy resin composition according to claim 3 wherein said polyhydric phenol is 2,2-bis-(4-hydroxyphenyl) propane.

5. The method of improving the solids suspending ability of a liquid polyepoxide resin composition comprising intimately mixing with said resin composition a polyhydric polyether having the general formula

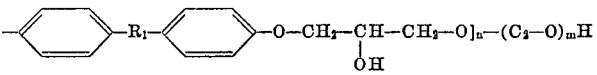

where $R_1$ is selected from the group consisting of

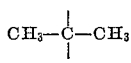

—S—, —$S_2$—, and —$SO_2$—; $R_2$ is an alkylene group containing from two to about six carbon atoms; $m$ is an integer from one to ten; and $n$ is an integer from one to three.

6. The method of retarding the sedimentation of finely-divided solids from a liquid epoxy resin composition and promoting the redispersion of settled particles comprising intimately mixing a liquid epoxy resin with a finely-divided solid in the presence of a polyhydric polyether having at least four hydroxyl groups per molecule, and having the formula

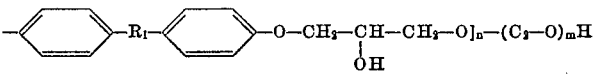

where $R_1$ is selected from the group consisting of

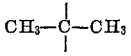

—S—, —$S_2$—, and —$SO_2$—; $R_2$ is an alkylene group containing from two to about six carbon atoms; $m$ is an integer from one to ten; and $n$ is an integer from one to three.

References Cited

UNITED STATES PATENTS

| 2,731,444 | 1/1956 | Greenlee | 260—47 |
| 2,914,490 | 11/1959 | Wheelock | 260—2 |
| 2,947,717 | 8/1960 | Belanger | 260—835 |
| 2,951,778 | 9/1960 | Haberlin | 260—830 |

M. TILLMAN, *Primary Examiner.*

P. LIEBERMAN, *Assistant Examiner.*